United States Patent [19]  [11] 4,173,676
Asakura et al.  [45] Nov. 6, 1979

[54] ADHESIVE TAPE

[75] Inventors: Hiroshi Asakura; Ippei Chimura; Keisuke Kitazume; Yoshiyuki Kaneko; Shirou Fuse; Akio Ueno, all of Kamakura, Japan

[73] Assignee: Toyo Kagaku Kabushiki Kaisha, Kanagawa, Japan

[21] Appl. No.: 850,218

[22] Filed: Nov. 10, 1977

[30] Foreign Application Priority Data

Dec. 28, 1976 [JP] Japan .................................. 51-157575
Apr. 30, 1977 [JP] Japan .................................. 52-49077

[51] Int. Cl.² ............................ B32B 7/10; C09J 7/02
[52] U.S. Cl. .................................... 428/332; 428/343; 428/354; 428/910
[58] Field of Search ............... 428/195, 343, 203, 211, 428/354, 332, 334, 910

[56] References Cited
U.S. PATENT DOCUMENTS

| 3,088,848 | 5/1963 | Trilsch | 428/343 |
| 3,556,894 | 1/1971 | Bernard | 428/343 X |
| 3,563,782 | 2/1971 | Liberman et al. | 428/343 X |
| 3,620,366 | 11/1971 | Blakely et al. | 428/343 X |
| 3,974,311 | 8/1976 | Cherrin | 428/343 X |
| 3,993,826 | 11/1976 | Butler et al. | 428/343 X |

Primary Examiner—Thomas J. Herbert, Jr.
Attorney, Agent, or Firm—Paul J. Sutton

[57] ABSTRACT

An adhesive tape is provided which comprises a film of high density polyethylene having a density of not less than 0.94 g/cc elongated at least six times only transversely to the longitudinal direction of the tape and a layer of pressure sensitive adhesive applied at least on one side of said elongated film of high density polyethylene. The adhesive tape has a high tensile strength against a force applied in a direction transverse to the longitudinal direction of the tape. Nevertheless, the tape can be easily torn or cut by user's hand or hands exactly transversely to the longitudinal direction of the tape without being torn zigzag or in a slanting direction.

5 Claims, 3 Drawing Figures

ADHESIVE TAPE

BACKGROUND OF THE INVENTION

1. Field of the Invention

This invention relates to an adhesive tape, and more particularly to an adhesive tape which may be conveniently used as a sealing tape for containers made of, for example corrugated cardboard or as a splicing adhesive tape for butt joining seams of elongated paper, cloth, film or the like.

2. Prior Art

Hithertofore there has been known an adhesive tape of the type for use as a splicing adhesive tape comprising a film of cellophane paper, kraft paper, polypropylene or the like as a substrate and a pressure sensitive adhesive applied to one side or both sides of the film. The adhesive tape of this type, however, has a disadvantage that it has less strength against a force applied in a lateral or transverse direction so that it can often readily be torn or cut off, particularly when it has a slight rent on its edge. To avoid such disadvantage there has been used a film of polyesters as a substrate which has relatively high strength. However, polyester films are quite expensive. Therefore, the tape of such type has not been widely used.

Alternatively, an adhesive tape for sealing, for example corrugated cardboard containers has been known in which paper, fabrics, a polypropylene film or a polyvinyl chloride film is used as a substrate, a pressure sensitive adhesive being applied to one side or both sides of the substrate. The adhesive sealing tape of the type in which paper is used as a substrate is not strong enough to seal containers filled with relatively heavy contents. Accordingly, a reinforced paper backed with various plastic films or fablics has been used as a substrate material. However, the reinforced paper adhesive tape has drawbacks that it is quite difficult to cut by hand or hands and even if it can, the tape has a tendency to cut zigzag or in a slanting direction. Therefore, one has to utilize a special cutting device, which results in inefficient packing operation. In addition, when a reinforcing plastic film or fabric is adhered to the substrate paper, it is generally required to use a special adhesive or primer due to weak affinity between the reinforcing material and the substrate paper. Consequently, complicate steps for applying adhesives and for receiving solvents are necessarily involved for the production of such reinforced paper adhesive tape. In the meanwhile, the adhesive sealing tape of the type in which a polypropylene film or a polyvinyl film is used as a substrate, has inferior properties at low temperature such as brittleness. Furthermore, polyethylene or polyvinylchloride has large stiffness as shown by bending test as well as large coefficient of tensile elasticity at an elongation of 5%. Hence, when the tape comprising a film of these materials is used for sealing packages containing cold contents such as frozen food or used under low temperatures, the bent portions of the tape tends to stretch so that the tape gets turned or tucks up and peels off out of the packages.

OBJECTS AND SUMMARY OF THE INVENTION

It is an object of the present invention to provide an adhesive tape which can be easily cut by user's hand or hands exactly in a transverse direction to the longitudinal direction of the tape and which nevertheless has a high tensile strength against a force applied in the same direction.

It is another object of the present invention to provide an adhesive tape which is cheap and therefore can be widely used.

It is still another object of the invention to provide an adhesive tape which can be produced in a simple manner.

It is a still further object of the invention to provide an adhesive tape which has excellent coldproof properties.

These and other objects of the invention will become apparent with reference to the following description.

An adhesive tape according to the invention comprises a film of high density polyethylene having a density of not less than 0.94 g/cc elongated at least six times only in a transverse direction to the longitudinal direction of the tape and a layer of pressure sensitive adhesive applied at least one side of said elongated film of high density polyethylene. A second layer of pressure sensitive adhesive may be applied to the other side of said film of high density polyethylene. A base paper material may also be sandwiched between the film of high density polyethylene and the pressure sensitive adhesive.

DESCRIPTION OF THE INVENTION

Figure 1:
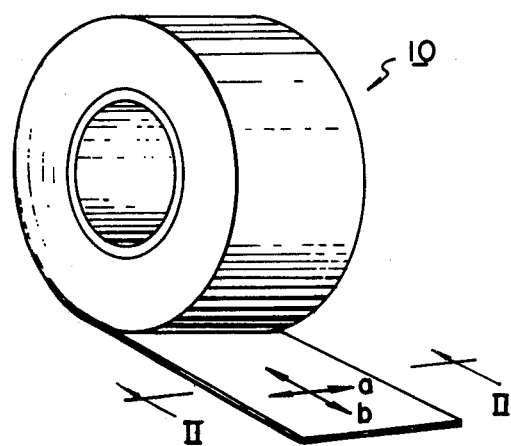
FIG. 1 is a perspective view showing an adhesive tape of rolled type according to the invention.
Figure 2:
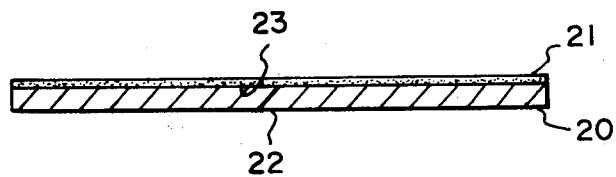
FIG. 2 is a schematic sectional view taken along line 2—2 of FIG. 1.
Figure 3:
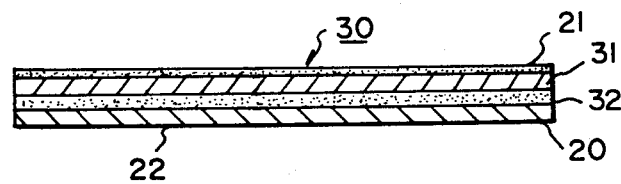
FIG. 3 is a schematic sectional view similar to FIG. 2 but showing another form of an adhesive tape according to the present invention.

Referring to FIG. 1, an adhesive tape of rolled type is generally indicated by reference numeral 10. It is, however, to be understood that the adhesive tape according to the invention is not limited only to the rolled type. In FIG. 2, an adhesive tape consisting of a film 20 of high density polyethylene and a layer 21 of pressure sensitive adhesive applied to one side of the film is shown. Although not shown in the accompanying drawings, a second layer of pressure sensitive adhesive may be applied to the other side of the film 20. In FIG. 3, another embodiment of the present invention is illustrated in which a paper adhesive tape 30 consists of a film 20 of high density polyethylene, a base paper material 31, a layer 32 of low density polyethylene sandwiched between the film 20 and the paper material 31 and a layer 21 of pressure sensitive adhesive applied to the paper material 31.

In any forms of the adhesive tape it is of great importance that a film of high density polyethylene having a density of not less than 0.94 g/cc elongated at least six times, preferably ten times only transversely to the longitudinal direction of the tape be used. In this connection, it is to be noted that "transversely or a transverse direction" herein referred to means a direction a shown by an arrow in FIG. 1, whereas "longitudinally or a longitudinal direction" herein referred to means a direction b denoted by an arrow in FIG. 1 which crosses at a right angle with the arrow a. The reason why a high density polyethylene film of not less than 0.94 g/cc is used according to the invention is that a high strength against a transversely applied force is provided and that this characteristic does not disappear even at low temperatures. That is, the adhesive tape of high density polyethylene of not less than 0.94 g/cc has a stiffness of 8 to 16 g and a coefficient of tensile elasticity at an elongation of 5% of less than 90 kg/mm$^2$. Therefore, such tape will not become brittle nor hardened under cold atmosphere so as to be intimately and yet firmly adhered to surfaces to be applied even to bent portions such as corners of a container. When a polyethylene film having a density of less than 0.94 g/cc is used, the advantages above mentioned cannot be obtained.

Furthermore, when the aforementioned high density polyethylene film is elongated only transversely not less than six times, the elongated film has an improved tensile strength against a force applied in a transverse direction and at the same time a lowered tear strength against a force applied in the same direction. Accordingly, the adhesive tape comprising such polyethylene film can be easily torn or cut by user's hand or hands exactly transversely without using cutters. Nevertheless, the tape retains a high tensile strength so that even when a transverse stress acts on the tape, it will not break or peel off. If the high density polyethylene film is elongated not less than ten times, the characteristic properties as set forth can be further enhanced. However, it is not possible to produce an effective elongated film at an elongation above sixteen times.

An adhesive tape having a density of less than 0.94 g/cc and/or elongated below six times in a transverse direction has not only insufficient transverse tensile strength but also high tear strength. Such tape, therefore, has to be cut by cutting devices. Still worse, when a transverse force is applied to the tape, it will easily split in a longitudinal direction.

The film of high density polyethylene may have a thickness of 10 to 100μ, preferably 15 to 60μ. In case of the adhesive tape shown in FIG. 2, the film may most preferably have a thickness of 30 to 60μ, while in case of the paper adhesive tape shown in FIG. 3, the thickness of the film may be thinner, i.e. most preferably 15 to 30μ. In a thickness of less than 10μ, a predetermined strength cannot be obtained. On the contrary, above 100μ, the film loses its flexibility. Accordingly, the adhesive tape cannot adhere intimately onto concaved or convexed surfaces to be applied. Particularly, when the tape is applied to corners of a container, it will peel off due to high restorable properties.

In producing the film 20 of high density polyethylene, polyethylene of a density of not less than 0.94 g/cc is subjected to extrusion molding by means of an extruder equipped with a flat die and thereafter to elongation treatment at least six times in a transverse direction by means of an elongating machine of tenter type. An exposure surface 22 of the film may be treated with a finishing agent. Any known agents including urethane type, polyester type, silicone type, shellac, paraffin wax and fluorine type may be used. Of these agents, a 2% toluene solution of bridging type silicone may preferably be used. After treatment the film is dried.

In producing the adhesive tape 10 in FIGS. 1 and 2, the pressure sensitive adhesive 21 is applied to an inner surface 23 of the film 20. In contrast, where the paper adhesive tape 30 in FIG. 3 is made, the adhesive 21 is applied to the base paper material 31. As the paper material, kraft paper such as clupak kraft paper may preferably be used although any other paper known in the art can be utilized. The thickness of the paper may be between 30 and 150 g/m$^2$, preferably 40 and 100 g/m$^2$.

The pressure sensitive adhesive 21 which may be used according to the invention includes a solvent type such as rubber system or acryl system, an emulsion type such as acryl system or vinylacetate system and a hot-melting type such as EVA systems (ethylenevinyl acetate system), rubber system or rubber polyamide resin system. The adhesive may be directly applied to the film 20 or the base paper material 31 whether the solvent type or emulsion type adhesive may be used if applied at a temperature below 120° C. In case of adhesives which cannot be adhered above 120° C., the transferring method can preferably be used whether the adhesive is of the solvent type, the emulsion type or of the hot-melting type above referred to. Where the adhesive tape 10 is made, the transferring method may most preferably be used with the hot-melting type adhesives. Of the hot-melting type adhesives, the rubber system consisting of the following commercially available products may be most preferred;

| | |
|---|---|
| Cariflex TR110 7 | (Shell Chemical) |
| Polybutene LV-100 | (Nisseki Resin Chemical) |
| Arkon M 100 | (Arakawa Rinsan Chemical) |
| Shellflex 371 | (Shell Chemical) |
| Anti-Oxidant BZ | (Ouchishinkoh Chemical) |

Meanwhile, where the paper adhesive tape 30 is made, the acryl system of the emulsion type adhesive such as sold under the trade name "Nikasol TS TB 3" by Nippon Carbide Kogyo K.K. including polyacrylate system may be most preferably used by means of the transferring method. The film 20 can be conveniently adhered to the base paper material 31 by sandwiching an adhesive layer 32 of low density polyethylene between the film 20 and the paper material 31 by means of lamination rollers. Of course, any known method may be applied for the adhesion of the film 20 to the base paper material 31.

Although particular forms of the tapes 10 and 30 have been described herein, the pressure sensitive adhesive 21 may be applied on both sides of the film 20. In any case the thickness of the pressure sensitive adhesive layer may preferably be between 5μ and 200μ.

The adhesive tape according to the invention may be used for teaching materials such as coloured paper if the base paper material 31 is coloured while the film 20 is transparent or translucent or if the base paper material 31 is white while the film 20 is coloured. In any form, pigments are not exposed on the surface so that the adhesive tape or modified coloured paper is suitable for children's use from sanitary standpoint of view. The adhesive tape can also be utilized for labels if the base paper material 31 is printed to form patterns, figures, letters or a combination thereof on its surface.

THE EXAMPLES OF THE INVENTION

EXAMPLE 1

High density polyethylene (density of 0.94 g/cc) M 1 0.9) was subjected to molding by means of an extruder equipped with a flat die and thereafter to elongation at various magnifications in a transverse direction at 130° C. by means of an elongating machine of tenter type to form a film having a thickness of 60μ. To this film a 2% toluene solution of bridging type silicone was applied and dried at 80° C. for bridging. Then a layer of pressure sensitive adhesive having the following compositions (thickness of 30μ) was provided on the other side of the film by the transferring method.

| | |
|---|---|
| Cariflex TR 110 7 (Shell Chemical) | 100 parts by wt. |
| (Thermoplastic block copolymer of styrene system) | |
| Arkon M-100 (Arakawa Rinsan Chemical) | 175 parts by wt. |
| (Tackifier of modified wood rosin system) | |
| Shellflex 371 (Shell Chemical) | 20 parts by wt. |
| (Naphthene system oil) | |
| Polybutene LV-100 (Nisseki Resin Chemical) | 5 parts by wt. |
| (Polybutene) | |
| Anti-Oxidant) BZ (Ouchishinroh Chemical) | 5 parts by wt. |
| (Anti-Oxidant) | |

The adhesive tape thus obtained was wound up to form a roll and cut into a plurality of rolls.

Various experiments were made. The result is given in Table I.

In the experiments in Table I, the transverse tensile strength was determined in accordance with Japanese Industrial Standard Z-1539 (Hereinafter referred to as JIS). The sample tape had a width of 150 mm.

The sealing strength of corrugated cardboard container was determined according to JIS-Z02020. A corrugated cardboard container (length 400 mm, width 330 mm, height 200 mm, thickness 5 mm), was packed with 200 rolls of vinyl adhesive tapes, each roll having a width of 19 mm and a length of 20 m (total weight of 18.4 kg.). The upper side and the bottom side of the container were sealed with the various tapes (width 50 mm) shown in Table I in the form of H figure. Then the container was dropped from an elevation of 1500 mm. The conditions of the container and the tapes were inspected.

The transverse tear strength was determined according to JIS-Z1523.

The easiness cut by hand was determined as follows: "Easy" means that the tapes were easily torn by one's hand right exactly in a transverse direction without using cutters.

"Difficult" means that even if cut by one's hand the tapes were not torn exactly in a transverse direction.

Whether or not the tape applied on the corners of the container tucked up was inspected in the following manners: The aforementioned container and the sample tapes were cooled in a room maintained at 0° C., where the container was sealed with the tapes in H figure and left for 3 days. The applied corners numbered as 1-5, 1-6, 3-5, 3-6, 5-1, 5-3, 6-1 and 6-3 in accordance with JIS-Z0201 were then inspected.

The Runs Nos. 7 through 10 are comparative examples. In Runs Nos. 7 and 8, the adhesive tapes were produced in the same manners as the preceding runs. However, the magnifications of the transverse elongation were 3 and 5, respectively.

Table 1

| Run No. | Material of film | Magnification of transverse elongation | Transverse tensile strength (Kg/10mm in width) | Sealing strength of corrugated cardboard container | Transverse tear strength (g) | Easiness cut by hand | Whether or not the tapes applied on the corners of the container tucked up |
|---|---|---|---|---|---|---|---|
| 1 | High density polyethylene | 6 | 15.0 | The container broken at the 18th drop but the tape not torn | 138 | Easy | None |
| 2 | " | 8 | 16.4 | At the 22nd drop the container broken but the tape not torn | 131 | " | " |
| 3 | " | 10 | 18.0 | At the 17th drop the container broken but the tape not torn | 120 | " | " |
| 4 | " | 12 | 19.1 | At the 18th drop the container broken but the tape not torn | 115 | " | " |
| 5 | " | 14 | 19.5 | At the 20th drop the container broken but the tape not torn | 109 | " | " |
| 6 | " | 16 | 21.2 | At the 21st drop the container broken but the tape not torn | 104 | " | " |
| 7 | " | 3 | 5.6 | At the 5th drop the tape splitted longitudinally | 257 | Difficult | " |
| 8 | " | 5 | 7.3 | At the 11th drop the tape splitted longitudinally | 205 | Rather difficult | " |
| 9 | Polypropylene | 6 | 8.0 | At the 12th drop the tape splitted longitudinally | 248 | Difficult | The tape tucked up |
| 10 | Polyvinylchloride | 6 | 5.3 | At the 9th drop the tape splitted longitudinally | 293 | " | " |

In Run No. 9, polypropylene commercially available under trade name "Mitsubishi Noblen" was subjected to molding in the same manner as the preceding runs and thereafter to elongation transversely six times at 150° C. by means of a tenter to obtain a film of 60μ in thickness. The same pressure sensitive adhesive (thickness 30μ) was adhered to one side of the film and would up to obtain a roll.

In Run No. 10, 100 parts by weight of polyvinyl chloride commercially available under trade name "Denka Vinyl SS 110", 3 parts by weight of cadmium stearate and 1 part by weight of a stabilizer were mixted and molded by the casting method. Then the moldings were elongated six times at 85° C. in a transverse direction to obtain a film of 60μ in thickness. The adhesive tape was made of this film in the same manner as Run No. 9.

As is apparent from Table I, the adhesive tapes according to the invention have the transverse tensile strengths three times as strong as those according to the comparative examples. Nevertheless the tear strengths are half as compared with those according to the comparative examples. Furthermore, the sealing strengths are excellent and the tapes are easily cut by user's hand.

EXAMPLE 2

Adhesive tapes were made of high density polyethylene (density 0.95 g/cc M I 0.9) in the same manner as in Example 1. The tapes were transversely elongated at various magnifications.

The adhesive tapes thus obtained were placed in a room maintained at $-40°$ C. and subjected to experiments similar to those according to Example I. The result is given in Table II.

transversely ten times by means of an elongating machine of the tenter type to obtain a film having a thickness of $20\mu$.

The film thus obtained was adhered to a base paper material with a layer of low density polyethylene having a thickness of $15\mu$ being sandwiched between the base paper material and the film and laminated by rollers. As the base paper material, clupak kraft paper having a weight per $m^2$ of 73 $g/m^2$ was used.

Then on the other side of the paper material a pressure sensitive adhesive was applied by means of a coating machine to have a thickness of $40\mu$ and dried at $110°$ to $130°$ C. The tapes thus obtained was wound up to form a roll and cut to have a width of 50 mm. The pressure sensitive adhesive has the following compositions:

Table II

| Run No. | Magnification of transverse elongation | Transverse tensile strength (kg/10 mm in width) | Sealing strength of corrugated cardboard container | Transverse tear strength (g) | Easiness cut by hand | Whether or not the tapes applied on the corners of the container tucked up |
|---|---|---|---|---|---|---|
| 11 | 4 | 10.4 | At the 12th drop the tape splitted longitudinally | 201 | Rather difficult | None |
| 12 | 6 | 29.0 | At the 22nd drop the container broken but the tape not torn | 118 | Easy | " |
| 13 | 8 | 31.6 | At the 18th drop the container broken but the tape not torn | 111 | " | " |
| 14 | 10 | 32.0 | At the 17th drop the container broken but the tape not torn | 106 | " | " |
| 15 | 12 | 36.4 | At the 18th drop the container broken but the tape not torn | 102 | " | " |
| 16 | 14 | 37.0 | At the 16th drop the container broken but the tape not torn | 99 | " | " |
| 17 | 16 | 38.0 | At the 22nd drop the container broken but the tape not torn | 98 | " | " |

Note:
Run No. 11 is a comparative example.

As is apparent from Table II, the adhesive tapes according to the invention have enhanced transverse tensile strengths even under $-40°$ C. as well as lowered tear strengths. As far as sealing strength and tucking-up are concerned, no inferior properties are observed. Hence, the adhesive tape can be efficiently used at low temperatures.

EXAMPLE 3

High density polyethylene having a density of 0.96 g/cc was extruded through a flat die and then elongated

| | |
|---|---|
| Natural rubber - MMA-AN graftpolymer | 4.1 parts by wt. |
| Terpene resin | 1.8 parts by wt. |
| Zinc white | 0.15 parts by wt. |
| Trimethylthiuram disulfide | 0.06 parts by wt. |
| Toluene | 6.0 parts by wt. |

The paper adhesive tapes thus obtained were subjected to various experiments. The result is given in Table III.

Table III

| Test | The paper adhesive tape according to the invention | | Known kraft adhesive tape | Known reinforced paper adhesive tape | Known fabric adhesive tape |
|---|---|---|---|---|---|
| Temperature (° C.) | 20 | −20 | 20 | 20 | 20 |
| Transverse tensile strength (kg/10mm in width) | 12.4 | 12.5 | 4.7 | 6.8 | 7.8 |
| Transverse elongation (%) | 18.3 | 16.3 | 5.0 | 10.9 | 6.8 |

Table III-continued

| Test | The paper adhesive tape according to the invention | Known kraft adhesive tape | Known reinforced paper adhesive tape | Known fabric adhesive tape |
| --- | --- | --- | --- | --- |
| Transverse tear strength (g) | 290    293 | 280 | 550 | 720 |
| The conditions of cut edges | Good    Good | Poor | Poor | Good |

In the experiments in Table III, the transverse tensile strength and the transverse elongation were determined according to JIS Z-1523. The transverse tear strength was determined according to JIS L-1004. The conditions of cut edges were determined by observing the edges of the tapes torn at a rate of 30 m/mm, each tape having had a notch of 3 mm in a transverse direction from the edge. "Good" means that the tape was torn exactly transversely, whereas "Poor" means that the tape was almost not torn transversely.

For the purpose of comparison, a kraft adhesive tape, a reinforced paper adhesive tape and a fabric adhesive tape commercially available under trade names "Nittoh Kraft Tape 7100", "Krapack 7150" and "Nittoh Nuno Tape" (Each produced by Nittoh Denki Kogyo K.K.), respectively were used.

From Table III it can be seen that the paper adhesive tape of the invention has transverse tensile strength several times as strong as the known kraft adhesive tape. Furthermore, the paper adhesive tape of the invention has larger transverse tensile strength than the known reinforced paper adhesive tape which are used for sealing containers containing heavy contents. The transverse tear strength of the paper adhesive tape according to the invention can be torn exactly in a transverse direction with a force almost equal to that required for the kraft adhesive tape of the known type. In addition, the strengths at room temperature are almost the same as those at −20° C.

EXAMPLE 4

The paper adhesive tapes were made in the same manner as in Example 3 except that the high density polyethylene films were elongated at various magnifications.

The result is given in Table IV.

Table IV

| Magnification of transverse elongation | Transverse tensile strength (kg/10mm in width) | Transverse tear strength (g) | The conditions of cut edges |
| --- | --- | --- | --- |
| 0 | 5.2 | 530 | Poor |
| 4 | 6.5 | 380 | * |
| 6 | 9.5 | 310 | Good |
| 8 | 11.3 | 285 | " |
| 10 | 12.4 | 292 | " |
| 12 | 12.6 | 275 | " |
| 14 | 13.5 | 280 | " |

Note:
* 10% of the test samples were not torn in a transverse direction.

The conditions of the cut edges were determined in accordance with Example 3.

As shown in Table IV, with a magnification of transverse elongation of not less than six, satisfactory results are obtained.

Further experiments were effected using the same paper adhesive tapes. However, the thickness of the high density polyethylene film was varied. The result is shown in Table V.

Table V

| Thickness (mm) | Transverse tensile strength (kg/10mm in width) | | | |
| --- | --- | --- | --- | --- |
| | Magnification of tensile elongation | | | |
| | 6 | 8 | 10 | 12 |
| 0.008 | 5.0 | 5.6 | 5.8 | — |
| 0.010 | 6.5 | 7.3 | 7.6 | 7.8 |
| 0.020 | 9.5 | 11.3 | 12.4 | 12.6 |
| 0.030 | 9.3 | 12.1 | 12.8 | 13.9 |
| 0.040 | 10.1 | 13.6 | 14.5 | 15.8 |
| 0.060 | 10.7 | 14.7 | 15.7 | 17.2 |

Note:
The tensile strength was determined according to JIS Z-1523.

With the adhesive tape comprising a film of a thickness of less than 0.010 mm, a satisfactory transverse tensile strength was not obtained. On the other hand, with the adhesive tape having a film of a thickness of more than 0.050 mm, favourable flexibility was not attained.

Although the present invention has been described with reference to preferred embodiments and examples, various modifications and variations can be made without departing from the spirit of the invention. It is intended that all these modifications and variations be included.

What is claimed is:

1. An adhesive tape comprising a film of high density polyethylene having a density of not less than 0.94 g/cc elongated six to sixteen times only transversely to the longitudinal direction of the tape and a layer of pressure sensitive adhesive applied at least on one side of said elongated film of high density polyethylene, said film of high density polyethylene having a thickness of 30 to 60μ.

2. The adhesive tape as claimed in claim 1 wherein said film of high density polyethylene is elongated at least ten times only transversely to the longitudinal direction of the tape.

3. The adhesive tape as claimed in claim 1 wherein said layer of pressure sensitive adhesive is applied to said one side of the film of high density polyethylene.

4. The adhesive tape as claimed in claim 1 wherein a second layer of pressure sensitive adhesive is applied to the other side of said film of high density polyethylene.

5. The adhesive tape as claimed in claim 1 wherein said adhesive tape is in the form of a roll.

* * * * *